United States Patent
Ikegawa et al.

(10) Patent No.: US 11,495,251 B1
(45) Date of Patent: Nov. 8, 2022

(54) MANUFACTURING METHOD FOR MAGNETIC HEAD FOR PERPENDICULAR MAGNETIC RECORDING INCLUDING A PAIR OF FIRST SIDE SHIELDS AND A PAIR OF SECOND SIDE SHIELDS

(71) Applicants: Yukinori Ikegawa, Milpitas, CA (US); Yoshitaka Sasaki, Los Gatos, CA (US); Kazuki Sato, Milpitas, CA (US); Shigeki Tanemura, Milpitas, CA (US)

(72) Inventors: Yukinori Ikegawa, Milpitas, CA (US); Yoshitaka Sasaki, Los Gatos, CA (US); Kazuki Sato, Milpitas, CA (US); Shigeki Tanemura, Milpitas, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 17/573,945

(22) Filed: Jan. 12, 2022

(51) Int. Cl.
  *G11B 5/11* (2006.01)
  *G11B 5/127* (2006.01)
  *G11B 5/31* (2006.01)

(52) U.S. Cl.
  CPC ............. *G11B 5/315* (2013.01); *G11B 5/11* (2013.01); *G11B 5/1278* (2013.01); *Y10T 29/49046* (2015.01)

(58) Field of Classification Search
  None
  See application file for complete search history.

(56) References Cited

U.S. PATENT DOCUMENTS

| | | | |
|---|---|---|---|
| 9,214,165 B1 * | 12/2015 | Liu et al. | G11B 5/315 |
| 9,336,798 B1 | 5/2016 | Sasaki et al. | |
| 9,406,318 B2 | 8/2016 | Sasaki et al. | |
| 10,586,558 B1 | 3/2020 | Sasaki et al. | |
| 2010/0315747 A1 * | 12/2010 | Matsumoto et al. | G11B 5/1278 360/246.2 |
| 2019/0228795 A1 * | 7/2019 | Sasaki et al. | G11B 5/315 |

* cited by examiner

*Primary Examiner* — Craig A. Renner
(74) *Attorney, Agent, or Firm* — Oliff PLC

(57) ABSTRACT

A write shield of a magnetic head includes a pair of first side shields and a pair of second side shields. The pair of first side shields each include a first side wall and a second side wall. The pair of second side shields each include a third side wall. The third side wall of one of the pair of second side shields is continuous with the first side wall of one of the pair of first side shields. The third side wall of the other of the pair of second side shields is continuous with the first side wall of the other of the pair of first side shields.

8 Claims, 9 Drawing Sheets

MANUFACTURING METHOD FOR MAGNETIC HEAD FOR PERPENDICULAR MAGNETIC RECORDING INCLUDING A PAIR OF FIRST SIDE SHIELDS AND A PAIR OF SECOND SIDE SHIELDS

BACKGROUND OF THE INVENTION

1. Field of the Invention

The present invention relates to a magnetic head for perpendicular magnetic recording for use to write data on a recording medium by means of a perpendicular magnetic recording system, and more specifically, to a magnetic head for perpendicular magnetic recording that includes side shields.

2. Description of the Related Art

The recording systems of magnetic read/write apparatuses include a longitudinal magnetic recording system wherein signals are magnetized in a direction along the plane of a recording medium (the longitudinal direction) and a perpendicular magnetic recording system wherein signals are magnetized in a direction perpendicular to the plane of a recording medium. It is known that the perpendicular magnetic recording system is harder to be affected by thermal fluctuation of the recording medium and capable of providing higher linear recording density when compared with the longitudinal magnetic recording system.

Magnetic heads for perpendicular magnetic recording typically have, like those for longitudinal magnetic recording, a structure in which a read head unit having a magnetoresistive element (hereinafter, also referred to as MR element) for reading and a write head unit having an induction-type electromagnetic transducer for writing are stacked on the top surface of a substrate. The write head unit includes a main pole configured to produce a write magnetic field in the direction perpendicular to the plane of the recording medium. The main pole has an end face that is located in a medium facing surface configured to face the recording medium.

In a magnetic head for use in a magnetic disk drive of the perpendicular magnetic recording system, from the viewpoint of increasing the recording density, the end face of the main pole located in the medium facing surface is preferably smaller in width. On the other hand, from the viewpoint of improving the write characteristics of the write head unit, e.g., overwrite property which represents the overwriting capability, the main pole preferably has a larger cross-sectional area in the vicinity of the medium facing surface.

A magnetic disk drive of the perpendicular magnetic recording system may sometimes exhibit a phenomenon in which signals already written on one or more tracks in the neighborhood of a track targeted for writing are erased or attenuated during writing of a signal on the track targeted for writing. In the present application, such a phenomenon will be referred to as unwanted erasure. Unwanted erasure includes adjacent track erasure (ATE) and wide-area track erasure (WATE). Achieving higher recording densities requires minimizing the occurrence of unwanted erasure.

Known techniques for minimizing the occurrence of unwanted erasure include the technique of providing two side shields on opposite sides of the main pole in the track width direction, as disclosed in, for example, U.S. Pat. No. 9,336,798 B1 and U.S. Pat. No. 9,406,318 B2.

In a magnetic head including two side shields, the shape of a main pole near a medium facing surface depends on the shapes of the two side shields. Thus, the shapes of the two side shields near the main pole need to be accurately controlled to increase the cross-sectional area of the main pole near the medium facing surface. However, along with proceeding miniaturization of the main pole, it has become difficult to control the shapes of the two side shields near the main pole to increase the cross-sectional area of the main pole near the medium facing surface.

SUMMARY OF THE INVENTION

The present invention is intended to provide a magnetic head for perpendicular magnetic recording that can have an increased cross-sectional area of a main pole near a medium facing surface, and a manufacturing method for the same.

A magnetic head for perpendicular magnetic recording according to the present invention includes: a medium facing surface configured to face a recording medium; a coil configured to generate a magnetic field corresponding to data to be written on the recording medium; a main pole configured to pass a magnetic flux corresponding to the magnetic field generated by the coil and generate a write magnetic field for writing the data on the recording medium by means of a perpendicular magnetic recording system; and a write shield formed of a magnetic material.

The write shield includes a pair of first side shields disposed on opposite sides of the main pole in a track width direction, and a pair of second side shields disposed on opposite sides of the main pole in the track width direction at a position farther from the medium facing surface than the pair of first side shields. The pair of first side shields each include an end face located on the medium facing surface, a first side wall connected to the end face and directed toward the main pole, and a second side wall connected to the first side wall.

The pair of second side shields are in contact with the pair of first side shields, respectively. The pair of second side shields each include a third side wall. The third side wall of one of the pair of second side shields is continuous with the first side wall of one of the pair of first side shields. The third side wall of the other of the pair of second side shields is continuous with the first side wall of the other of the pair of first side shields.

In the magnetic head for perpendicular magnetic recording according to the present invention, a distance between the third side wall of one of the pair of second side shields and the third side wall of the other of the pair of second side shields may increase with increasing distance from the medium facing surface. In this case, a distance between a portion of the first side wall of one of the pair of first side shields and a portion of the first side wall of the other of the pair of first side shields may increase with increasing distance from the medium facing surface. The portion of the first side wall of one of the pair of first side shields may be a portion continuous with the third side wall of one of the pair of second side shields. The portion of the first side wall of the other of the pair of first side shields may be a portion continuous with the third side wall of the other of the pair of second side shields.

In the magnetic head for perpendicular magnetic recording according to the present invention, saturation magnetic flux density of a magnetic material of which the pair of second side shields are formed may be different from saturation magnetic flux density of a magnetic material of which the pair of first side shields are formed.

In the magnetic head for perpendicular magnetic recording according to the present invention, the main pole may include a first side surface and a second side surface that are positioned on opposite sides of the main pole in the track width direction. A portion of the first side surface may have a shape along the first side wall of one of the pair of first side shields to which the first side surface faces. A portion of the second side surface may have a shape along the first side wall of the other of the pair of first side shields to which the second side surface faces. A distance between the other portion of the first side surface and the third side wall of one of the pair of second side shields to which the first side surface faces may increase with increasing distance from the medium facing surface. A distance between the other portion of the second side surface and the third side wall of the other of the pair of second side shields to which the second side surface faces may increase with increasing distance from the medium facing surface.

In the magnetic head for perpendicular magnetic recording according to the present invention, a distance between the other portion of the first side surface and the third side wall to which the first side surface faces may increase with increasing distance from the medium facing surface. A distance between the other portion of the second side surface and the third side wall to which the second side surface faces may increase with increasing distance from the medium facing surface.

A manufacturing method for the magnetic head for perpendicular magnetic recording according to the present invention includes: a step of forming a pair of first initial side shields; a step of forming the pair of second side shields; a step of etching the pair of first initial side shields by using the pair of second side shields as an etching mask so that the pair of first initial side shields become the pair of first side shields; and a step of forming the main pole.

In the manufacturing method for the magnetic head for perpendicular magnetic recording according to the present invention, the step of forming the main pole may be performed after the step of etching the pair of first initial side shields.

In the magnetic head for perpendicular magnetic recording and the manufacturing method for the same according to the present invention, the write shield includes the pair of first side shields and the pair of second side shields. The pair of first side shields each include the end face located on the medium facing surface, the first side wall connected to the end face and directed toward the main pole, and the second side wall connected to the first side wall. The third side wall of one of the pair of second side shields is continuous with the first side wall of one of the pair of first side shields. The third side wall of the other of the pair of second side shields is continuous with the first side wall of the other of the pair of first side shields. With this configuration, according to the present invention, it is possible to have an increased cross-sectional area of the main pole near the medium facing surface.

Other and further objects, features and advantages of the present invention will appear more fully from the following description.

DETAILED DESCRIPTION OF THE PREFERRED EMBODIMENTS

Figure 1:
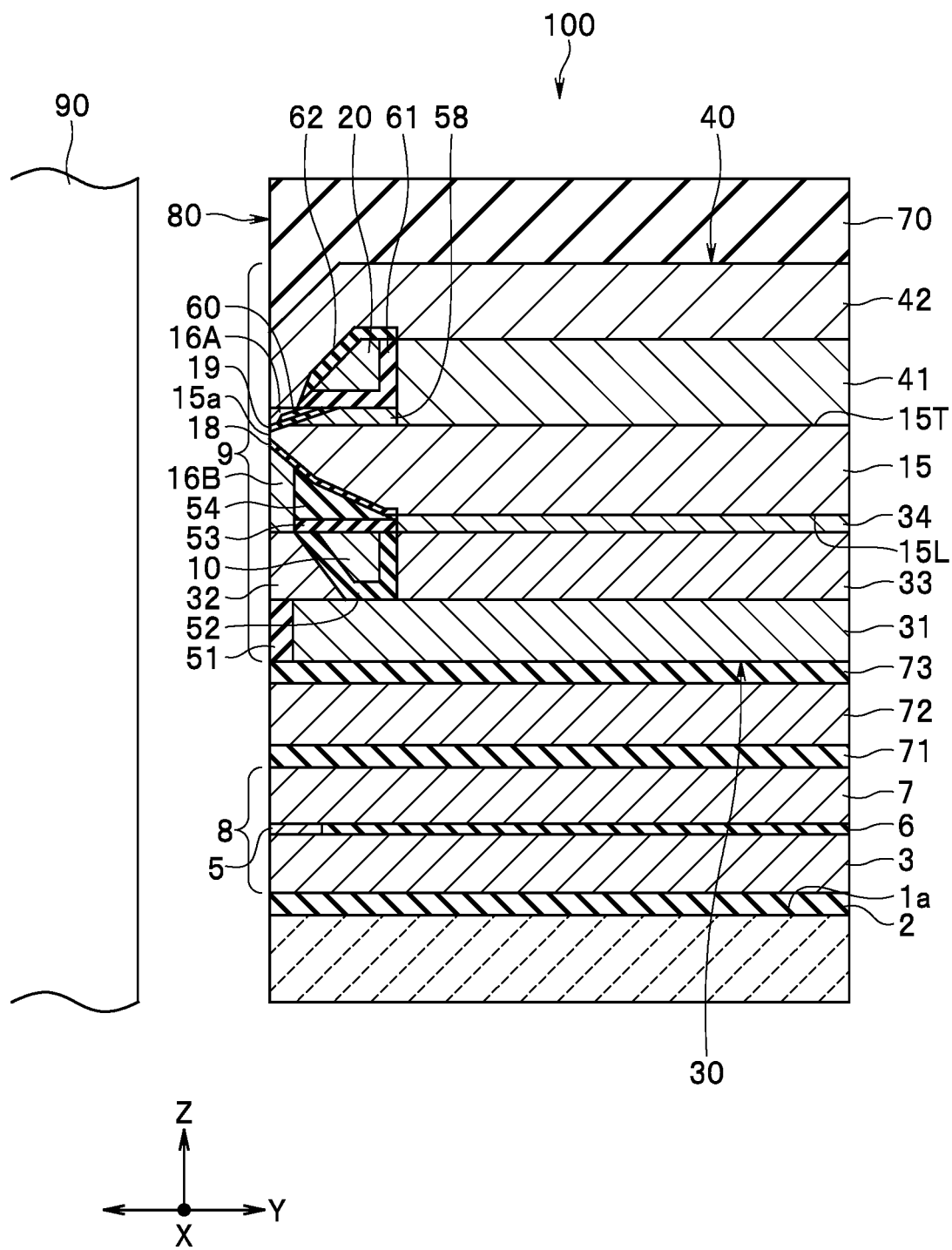
FIG. 1 is a cross-sectional view showing a configuration of a magnetic head according to an embodiment of the invention.
Figure 2:
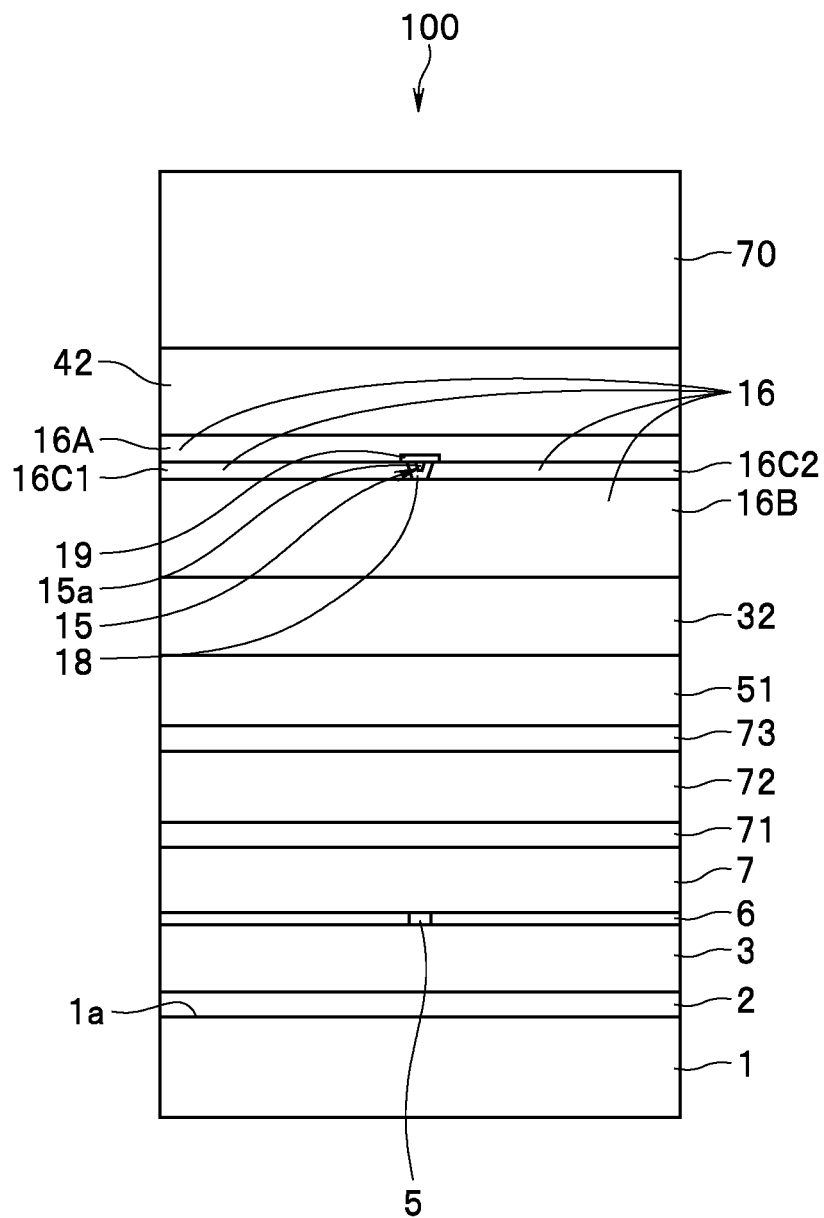
FIG. 2 is a front view showing a medium facing surface of the magnetic head according to the embodiment of the invention.
Figure 3:
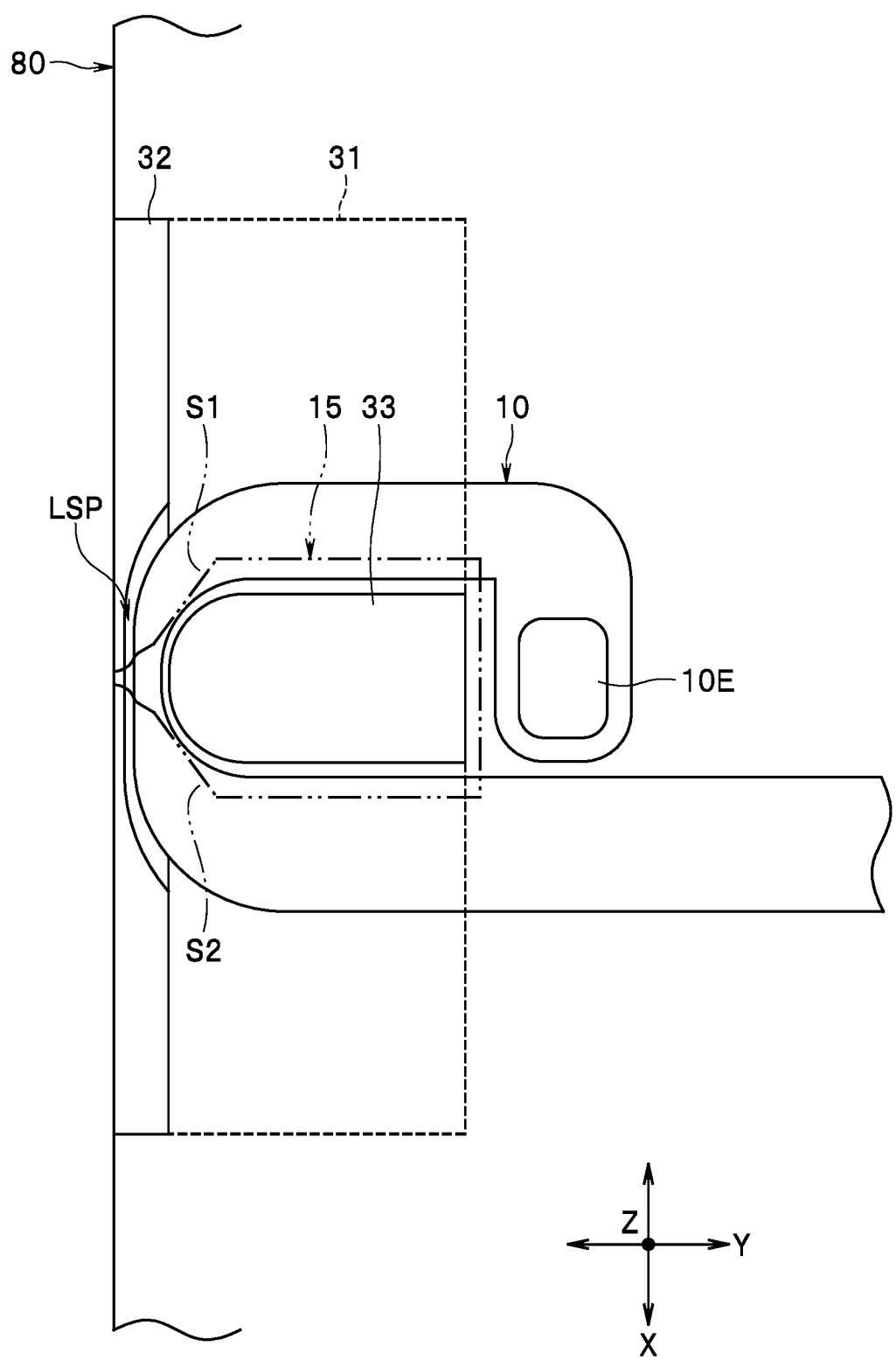
FIG. 3 is a plan view showing a lower coil portion of the magnetic head according to the embodiment of the invention.
Figure 4:
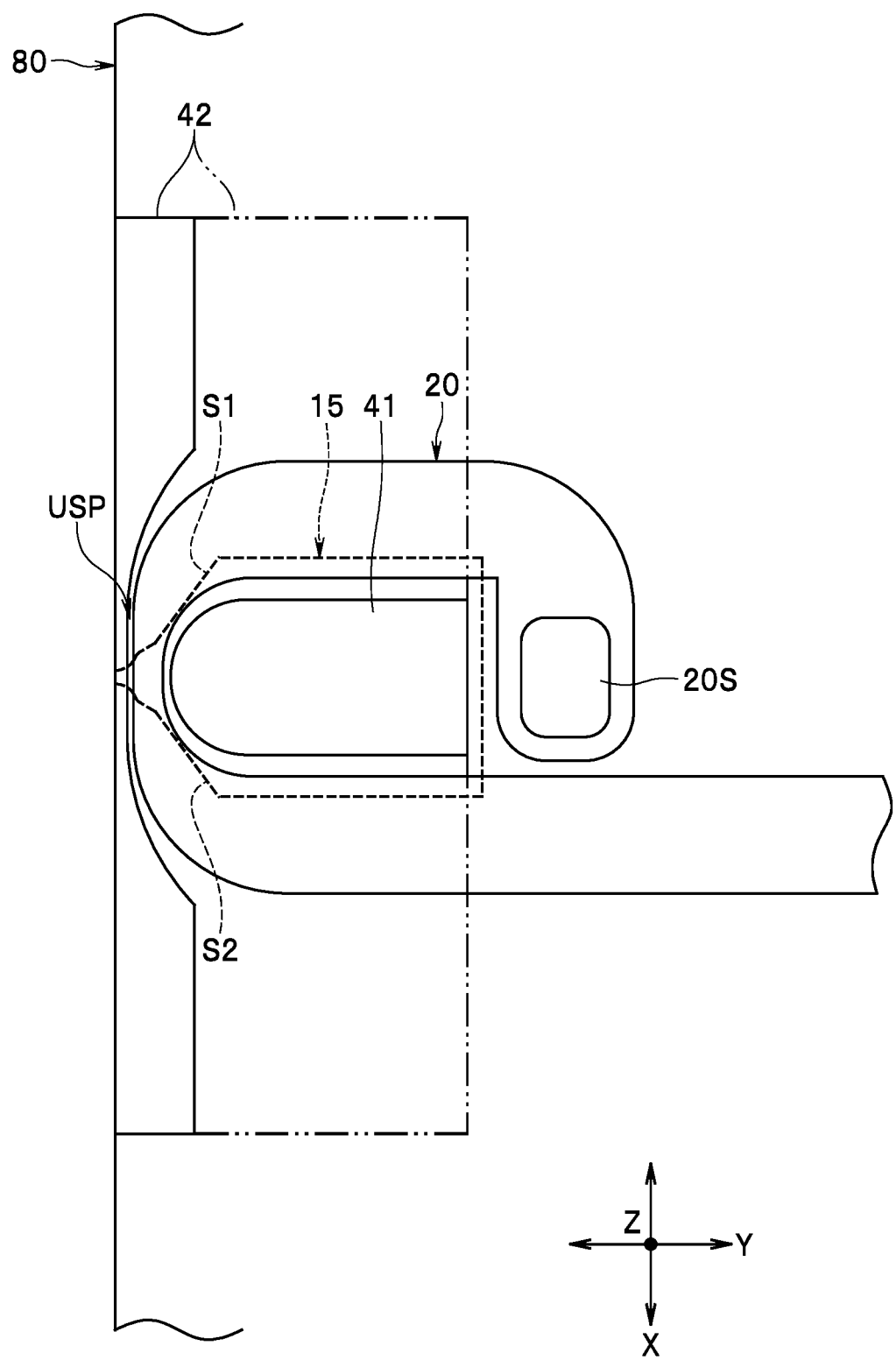
FIG. 4 is a plan view showing an upper coil portion of the magnetic head according to the embodiment of the invention.
Figure 5:
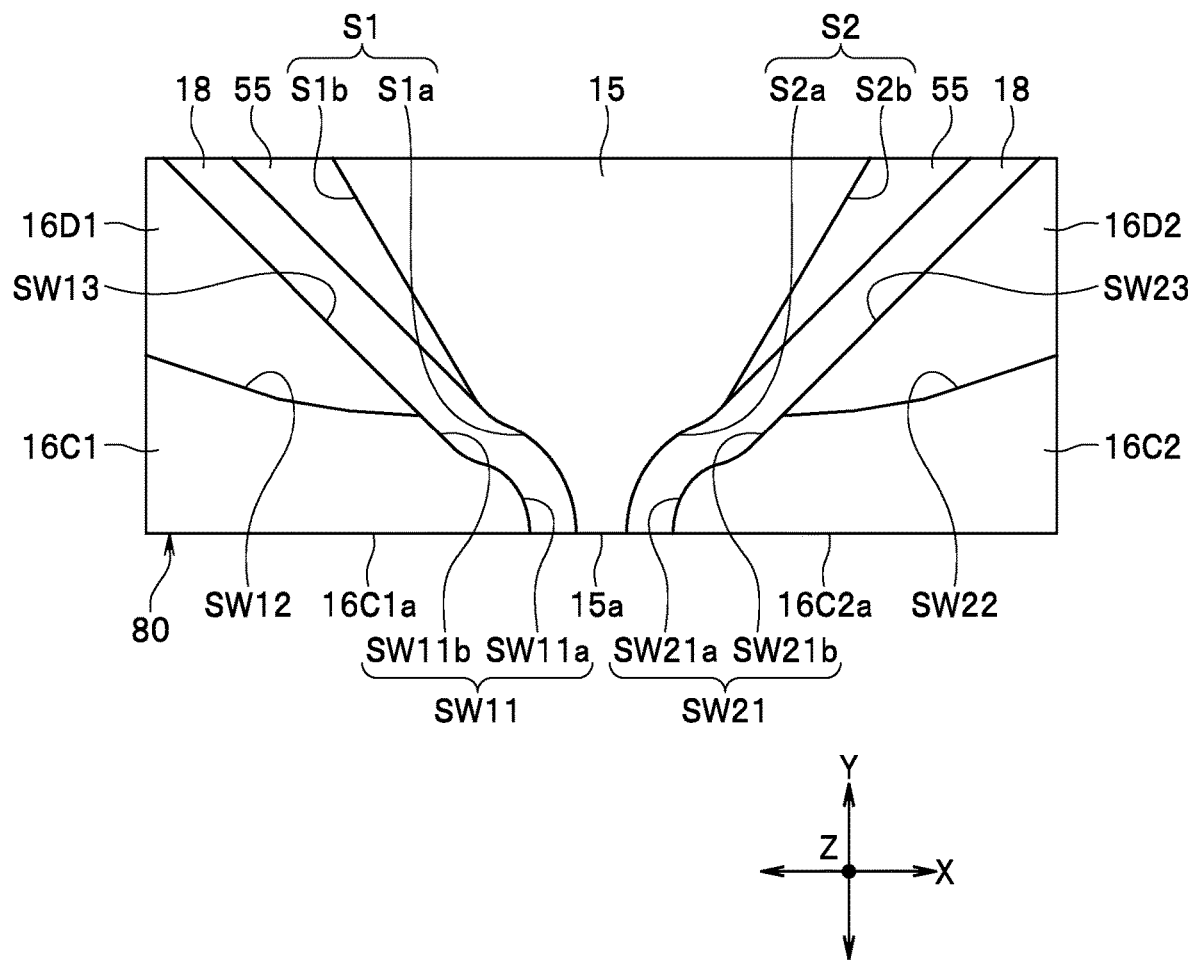
FIG. 5 is a plan view showing essential parts of the magnetic head according to the embodiment of the invention.

Preferred embodiments of the present invention will now be described in detail with reference to the drawings. First, reference is made to FIG. 1 to FIG. 5 to describe the configuration of a magnetic head for perpendicular magnetic recording (hereinafter simply referred to as magnetic head) according to an embodiment of the invention. FIG. 1 is a cross-sectional view showing the magnetic head according to the present embodiment. FIG. 2 is a front view showing a medium facing surface of the magnetic head according to the present embodiment. FIG. 3 is a plan view showing a lower coil portion of the magnetic head according to the present embodiment. FIG. 4 is a plan view showing an upper coil portion of the magnetic head according to the present embodiment. FIG. 5 is a plan view showing the essential parts of the magnetic head according to the present embodiment.

The magnetic head 100 according to the present embodiment is one intended for perpendicular magnetic recording. The magnetic head 100 according to the present embodiment is for use with, e.g., a magnetic disk drive, and is incorporated in a slider configured to fly over the surface of a rotating recording medium 90. The slider has a medium facing surface 80 configured to face the recording medium 90. The medium facing surface 80 has an air inflow end (a leading end) and an air outflow end (a trailing end). An airflow that comes from the leading end into the space between the medium facing surface 80 and the recording medium 90 causes the slider to slightly fly over the surface of the recording medium 90.

X, Y, and Z directions are defined here as follows. The X direction is the direction across the tracks of the recording medium 90, i.e., the track width direction. The Y direction is a direction perpendicular to the medium facing surface 80. The Z direction is the direction of travel of the recording medium 90 as viewed from the slider. The X, Y, and Z directions are orthogonal to one another.

As shown in FIG. 1, the magnetic head 100 has the aforementioned medium facing surface 80. Further, as shown in FIG. 1 and FIG. 2, the magnetic head 100 includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a first read shield layer 3 formed of a magnetic material and disposed on the insulating layer 2; a magnetoresistive (MR) element 5 as a read element disposed on the first read shield layer 3; an insulating layer 6 formed of an insulating material and disposed around the MR element 5; and a second read shield layer 7 formed of a magnetic material and disposed on the MR element 5 and the insulating layer 6.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element.

The parts from the first read shield layer 3 to the second read shield layer 7 constitute a read head unit 8. The magnetic head 100 further includes: a nonmagnetic layer 71 formed of a nonmagnetic material and disposed on the second read shield layer 7; a middle shield layer 72 formed of a magnetic material and disposed on the nonmagnetic layer 71; a nonmagnetic layer 73 formed of a nonmagnetic material and disposed on the middle shield layer 72; and a write head unit 9 disposed on the nonmagnetic layer 73. The middle shield layer 72 has a function of shielding the MR element 5 from magnetic fields generated in the write head unit 9. The nonmagnetic layers 71 and 73 are formed of alumina, for example.

The write head unit 9 includes a coil, a main pole 15, and a write shield 16. The coil generates a magnetic field corresponding to data to be written on the recording medium 90. The coil includes an upper coil portion 20 and a lower coil portion 10. Each of the upper coil portion 20 and the lower coil portion 10 is formed of a conductive material such as copper. The upper coil portion 20 and the lower coil portion 10 are connected in series or in parallel. The main pole 15 has an end face 15a located in the medium facing surface 80, and is configured to pass a magnetic flux corresponding to the magnetic field generated by the coil and to generate a write magnetic field for writing data on the recording medium 90 by means of a perpendicular magnetic recording system. FIG. 1 shows a cross section that intersects the end face 15a of the main pole 15 and that is perpendicular to the medium facing surface 80 and to the top surface 1a of the substrate 1.

As shown in FIG. 2, the write shield 16 includes a trailing shield 16A, and a leading shield 16B. The trailing shield 16A is located forward relative to the main pole 15 in the direction of travel of the recording medium 90 (the Z direction). Being located forward relative to the main pole 15 in the direction of travel of the recording medium 90 refers to being located farther from the top surface 1a of the substrate 1 than the main pole 15. The leading shield 16B is located backward relative to the main pole 15 in the direction of travel of the recording medium 90. Being located backward relative to the main pole 15 in the direction of travel of the recording medium 90 refers to being located closer to the top surface 1a of the substrate 1 than the main pole 15.

As shown in FIGS. 2 and 5, the write shield 16 further includes a pair of first side shields 16C1 and 16C2 and a pair of second side shields 16D1 and 16D2. The first side shields 16C1 and 16C2 are disposed on opposite sides of the main pole 15 in the track width direction (X direction) at positions farther from the top surface 1a of the substrate 1 than the leading shield 16B, and magnetically couple the trailing shield 16A and the leading shield 16B. The second side shields 16D1 and 16D2 are disposed on opposite sides of the main pole 15 in the track width direction (X direction) at positions farther from the medium facing surface 80 than the first side shields 16C1 and 16C2.

The write shield 16 is formed of a magnetic material. For example, CoFeN, CoNiFe, FeNi, or CoFe may be used as the material of the write shield 16.

The write head unit 9 further includes an upper return path section 40 and a lower return path section 30. Both the upper return path section 40 and the lower return path section 30 are formed of a magnetic material. For example, CoFeN, CoNiFe, FeNi, or CoFe may be used as the material of the upper return path section 40 and the lower return path section 30.

The upper return path section 40 is located forward relative to the main pole 15 in the direction of travel of the recording medium 90, and connects part of the main pole 15 located away from the medium facing surface 80 to the write shield 16, thereby magnetically coupling the main pole 15 to the write shield 16. The upper return path section 40 and the main pole 15 define an upper space USP (see FIG. 4) for a portion of the coil to pass through.

The lower return path section 30 is located backward relative to the main pole 15 in the direction of travel of the recording medium 90, and connects part of the main pole 15 located away from the medium facing surface 80 to the write shield 16, thereby magnetically coupling the main pole 15 to the write shield 16. The lower return path section 30 and the main pole 15 define a lower space LSP (see FIG. 3) for a portion of the coil to pass through.

The lower return path section 30 includes coupling sections 31, 32, 33, and 34. The coupling section 31 is disposed on the nonmagnetic layer 73. The coupling sections 32 and 33 are both disposed on the coupling section 31. The coupling section 32 is located near the medium facing surface 80. The coupling section 33 is located farther from the medium facing surface 80 than the coupling section 32. The coupling section 31 has an end face located at a distance from the medium facing surface 80. The coupling section 32 has an end face located in the medium facing surface 80.

As shown in FIG. 3, the lower coil portion 10 is wound around the coupling section 33. The write head unit 9 further includes: an insulating layer 51 formed of an insulating material and disposed on the nonmagnetic layer 73 to surround the coupling section 31; an insulating film 52 formed of an insulating material and separating the lower coil portion 10 from the coupling sections 31 to 33; and an unshown insulating layer formed of an insulating material and disposed around the lower coil portion 10 and the coupling section 32. The top surfaces of the lower coil portion 10, the coupling sections 32 and 33, the insulating film 52, and the unshown insulating layer are even with each other. The insulating layer 51, the insulating film 52, and the unshown insulating layer are formed of alumina, for example.

The leading shield 16B is disposed on the coupling section 32. The coupling section 34 is disposed on the coupling section 33. The write head unit 9 further includes an insulating layer 53 formed of an insulating material. The insulating layer 53 lies on the top surfaces of the lower coil portion 10, the insulating film 52, and the unshown insulating layer. The insulating layer 53 is formed of alumina, for example.

The write head unit 9 further includes a nonmagnetic layer 54 formed of a nonmagnetic material. The nonmagnetic layer 54 lies on the insulating layer 53 and surrounds the leading shield 16B and the coupling section 34. The nonmagnetic layer 54 is formed of alumina or silicon oxide ($SiO_2$), for example.

The first side shields 16C1 and 16C2 are disposed on the leading shield 16B. Although not shown, the second side shields 16D1 and 16D2 may each include a portion disposed on the leading shield 16B. In this case, the second side shields 16D1 and 16D2 may or may not each further include a portion disposed on the nonmagnetic layer 54. Alternatively, the second side shields 16D1 and 16D2 may each be entirely disposed on the nonmagnetic layer 54.

The main pole 15 has the end face 15a, and also a top surface 15T (see FIG. 1) farthest from the top surface 1a of the substrate 1, a bottom end 15L (see FIG. 1) opposite to the top surface 15T, and a first side surface S1 and a second side surface S2 (see FIG. 3 and FIG. 4) opposite to each other in the track width direction (the X direction). As shown in FIG. 5, the first side shield 16C1 includes a side wall facing a portion located near the medium facing surface 80 on the first side surface S1 of the main pole 15. The first side shield 16C2 includes a side wall facing a portion located near the medium facing surface 80 on the second side surface S2 of the main pole 15. The second side shield 16D1 includes a side wall facing a portion located away from the medium facing surface 80 on the first side surface S1 of the main pole 15. The second side shield 16D2 includes a side wall facing a portion located away from the medium facing surface 80 on the second side surface S2 of the main pole 15. The side wall of each of the first side shields 16C1 and 16C2 and the second side shields 16D1 and 16D2 will be described later in detail.

The write head unit 9 further includes a first gap layer 18 formed of a nonmagnetic material. The first gap layer 18 is disposed along the side walls of the first side shields 16C1 and 16C2 and the side walls of the second side shields 16D1 and 16D2, the top surface of the leading shield 16B, and the top surface of the nonmagnetic layer 54. An example of the nonmagnetic material used to form the first gap layer 18 is an insulating material such as alumina.

As shown in FIG. 1, the first gap layer 18 is interposed between a portion of the bottom end 15L of the main pole 15 and the top surfaces of the leading shield 16B and the nonmagnetic layer 54. As shown in FIGS. 2 and 5, the first gap layer 18 is also interposed between the first side surface S1 of the main pole 15 and the side wall of each of the first and second side shields 16C1 and 16D1 and between the second side surface S2 of the main pole 15 and the side wall of each of the first and second side shields 16C2 and 16D2.

At a location apart from the medium facing surface 80, the bottom end 15L of the main pole 15 is in contact with the top surface of the coupling section 34. The main pole 15 is formed of a ferromagnetic material containing one or more elements selected from Ni, Fe, and Co, such as FeNi, CoNiFe, or CoFe.

As shown in FIG. 5, the write head unit 9 further includes a nonmagnetic layer 55 formed of a nonmagnetic material and disposed around the main pole 15. The nonmagnetic layer 55 is interposed between the main pole 15 and each of the second side shields 16D1 and 16D2. The nonmagnetic layer 55 may or may not be interposed between the main pole 15 and each of the first side shields 16C1 and 16C2. An example of the nonmagnetic material used to form the nonmagnetic layer 55 is an insulating material such as alumina.

The write head unit 9 further includes a nonmagnetic layer 58 formed of a nonmagnetic metal material and disposed on a first portion of the top surface 15T of the main pole 15, the first portion being located away from the medium facing surface 80. The nonmagnetic layer 58 is formed of Ru, NiCr, or NiCu, for example.

The write head unit 9 further includes a second gap layer 19 formed of a nonmagnetic material. The second gap layer 19 is disposed to cover the main pole 15 and the nonmagnetic layer 58. An example of the nonmagnetic material used to form the second gap layer 19 is an insulating material such as alumina.

The write head unit 9 further includes a nonmagnetic layer 60 formed of a nonmagnetic material and disposed on the second gap layer 19. The nonmagnetic layer 60 has an end closest to the medium facing surface 80, the end being located at a distance from the medium facing surface 80. The nonmagnetic layer 60 is formed of alumina, for example.

The trailing shield 16A lies over the first side shields 16C1 and 16C2, the second gap layer 19 and the nonmagnetic layer 60, and is in contact with the top surfaces of the first side shields 16C1 and 16C2, the second gap layer 19, and the nonmagnetic layer 60. The trailing shield 16A may or may not be in contact with the top surfaces of the second side shields 16D1 and 16D2. The trailing shield 16A has a front end face located in the medium facing surface 80. In the medium facing surface 80, a portion of the front end face of the trailing shield 16A is spaced from the end face 15a of the main pole 15 by a predetermined distance created by the thickness of the second gap layer 19. The thickness of the second gap layer 19 preferably falls within the range of 5 to 60 nm, and may be 30 to 60 nm, for example. The end face 15a of the main pole 15 has a side adjacent to the second gap layer 19, the side defining the track width.

The upper return path section 40 includes coupling sections 41 and 42. The coupling section 41 lies on a second portion of the top surface 15T of the main pole 15, the second portion being located away from the medium facing surface 80. The second portion of the top surface 15T of the main pole 15 is located farther from the medium facing surface 80 than the first portion of the top surface 15T of the main pole 15.

As shown in FIG. 4, the upper coil portion 20 is wound around the coupling section 41. The write head unit 9 further includes: a first insulating film 61 formed of an insulating material and separating at least part of the upper coil portion 20 from the second gap layer 19, the coupling section 41 and the nonmagnetic layers 58 and 60; a second insulating film 62 formed of an insulating material and disposed to cover at least part of the upper coil portion 20 and the first insulating film 61; and an unshown nonmagnetic layer formed of an insulating material and disposed around the trailing shield 16A, the upper coil portion 20, and the coupling section 41. The first and second insulating films 61 and 62 are formed of alumina, for example. An example of the nonmagnetic material used to form the unshown nonmagnetic layer is an insulating material such as alumina.

The coupling section 42 is disposed on the trailing shield 16A, the coupling section 41, and the second insulating film 62. The coupling section 42 has an end face located in the medium facing surface 80.

The magnetic head 100 further includes a protective layer 70 formed of a nonmagnetic material and disposed to cover the write head unit 9. The protective layer 70 is formed of, for example, an inorganic insulating material such as alumina.

As has been described, the magnetic head 100 according to the present embodiment includes the medium facing surface 80, the read head unit 8, and the write head unit 9. The read head unit 8 and the write head unit 9 are stacked on the substrate 1. The write head unit 9 is located forward relative to the read head unit 8 in the direction of travel of the recording medium 90 (the Z direction).

The write head unit 9 includes the coil including the upper coil portion 20 and the lower coil portion 10, the main pole 15, the write shield 16, the first gap layer 18, and the second gap layer 19. The write shield 16 includes the trailing shield 16A, the leading shield 16B, the first side shields 16C1 and 16C2, and the second side shields 16D1 and 16D2.

The write head unit 9 further includes the upper return path section 40 and the lower return path section 30. The upper return path section 40 includes the coupling sections 41 and 42. The lower return path section 30 includes the coupling sections 31, 32, 33, and 34.

The write shield 16 captures a disturbance magnetic field applied to the magnetic head 100 from outside the magnetic head 100. This can prevent erroneous writing on the recording medium 90 that would be caused by the disturbance magnetic field being intensively captured into the main pole 15. The write shield 16 further has the function of capturing a magnetic flux that is generated from the end face 15a of the main pole 15 and spreads in directions other than the direction perpendicular to the plane of the recording medium 90, and thereby preventing the magnetic flux from reaching the recording medium 90. Furthermore, the write shield 16, the upper return path section 40, and the lower return path section 30 have the function of allowing a magnetic flux that has been generated from the end face 15a of the main pole 15 and has magnetized a portion of the recording medium 90 to flow back.

Reference is now made to FIGS. 3 and 4 to describe the connection relationship between the upper coil portion 20 and the lower coil portion 10 of the coil. As shown in FIG. 3, the lower coil portion 10 has a coil connection 10E electrically connected to the upper coil portion 20. As shown in FIG. 4, the upper coil portion 20 has a coil connection 20S electrically connected to the coil connection 10E of the lower coil portion 10. The coil connection 20S is electrically connected to the coil connection 10E via a first and a second connection layer of columnar shape (not illustrated) that penetrate a plurality of layers interposed between the upper coil portion 20 and the lower coil portion 10. The first and second connection layers are stacked in this order on the coil connection 10E. The coil connection 20S lies on the second connection layer. The first and second connection layers are formed of a conductive material such as copper. In the example shown in FIGS. 3 and 4, the upper coil portion 20 and the lower coil portion 10 are connected in series.

Reference is now made to FIG. 5 to describe in detail the shapes and disposition of the main pole 15, the pair of the first side shields 16C1 and 16C2, and the pair of the second side shields 16D1 and 16D2. The first side shield 16C1 includes an end face 16C1a located on the medium facing surface 80, a first side wall SW11 connected to the end face 16C1a and directed toward the main pole 15, and a second side wall SW12 connected to the first side wall SW11. An edge is formed between the first side wall SW11 and the second side wall SW12.

The first side shield 16C2 includes an end face 16C2a located on the medium facing surface 80, a first side wall SW21 connected to the end face 16C2a and directed toward the main pole 15, and a second side wall SW22 connected to the first side wall SW21. An edge is formed between the first side wall SW21 and the second side wall SW22.

The second side shield 16D1 is in contact with the second side wall SW12 of the first side shield 16C1. The second side shield 16D1 includes a third side wall SW13 continuous with the first side wall SW11 of the first side shield 16C1. The third side wall SW13 is connected to the edge formed between the first side wall SW11 and the second side wall SW12, in other words, an end part of the first side wall SW11, the end part being farthest from the medium facing surface 80.

The second side shield 16D2 is in contact with the second side wall SW22 of the first side shield 16C2. The second side shield 16D2 includes a third side wall SW23 continuous with the first side wall SW21 of the first side shield 16C2. The third side wall SW23 is connected to the edge formed between the first side wall SW21 and the second side wall SW22, in other words, an end part of the first side wall SW21, the end part being farthest from the medium facing surface 80.

The distance between the third side wall SW13 of the second side shield 16D1 and the third side wall SW23 of the second side shield 16D2 increases with increasing distance from the medium facing surface 80.

The first side wall SW11 of the first side shield 16C1 includes a portion SW11a near the medium facing surface 80, and a portion SW11b continuous with the third side wall SW13 of the second side shield 16D1 at a position farther from the medium facing surface 80 than the portion SW11a. The first side wall SW21 of the first side shield 16C2 includes a portion SW21a near the medium facing surface 80, and a portion SW21b continuous with the third side wall SW23 of the second side shield 16D2 at a position farther from the medium facing surface 80 than the portion SW21a. The distance between the portion SW11b and the portion SW21b increases with increasing distance from the medium facing surface 80.

The portion SW11b and the third side wall SW13 constitute one continuous side wall. The one side wall may have a shape with no step between the first side shield 16C1 and the second side shield 16D1. Alternatively, the one side wall may have a shape with a curvature that does not change or hardly changes as compared to that of the portion SW11a.

The portion SW21b and the third side wall SW23 constitute one continuous side wall. The one side wall may have a shape with no step between the first side shield 16C2 and the second side shield 16D2. Alternatively, the one side wall may have a shape with a curvature that does not change or hardly changes as compared to that of the portion SW21a.

The saturation magnetic flux density of a magnetic material of which the second side shields 16D1 and 16D2 are formed may be different from the saturation magnetic flux density of a magnetic material of which the first side shields 16C1 and 16C2 are formed. For example, the saturation magnetic flux density of the magnetic material of which the second side shields 16D1 and 16D2 are formed may be higher or lower than the saturation magnetic flux density of the magnetic material of which the first side shields 16C1 and 16C2 are formed. The saturation magnetic flux density of the magnetic material of which the first side shields 16C1 and 16C2 are formed is, for example, 13 kG. In this case, the saturation magnetic flux density of the magnetic material of which the second side shields 16D1 and 16D2 are formed is, for example, 10 kG or 16 kG.

The first side surface S1 of the main pole 15 includes a portion S1a near the medium facing surface 80, and a portion S1b farther from the medium facing surface 80 than the portion S1a. The portion S1a has a shape along the first side wall SW11 to which the first side surface S1 faces. The first gap layer 18 is interposed between the portion S1a and the first side wall SW11 to which the first side surface S1 faces. The distance between the portion S1a and the first side wall SW11 to which the first side surface S1 faces is constant or substantially constant irrespective of the distance from the medium facing surface 80. The first gap layer 18 and the nonmagnetic layer 55 are interposed between the portion S1*b* and the third side wall SW13 to which the first side surface S1 faces. The distance between the portion S1*b* and the third side wall SW13 to which the first side surface S1 faces increases with increasing distance from the medium facing surface 80.

The second side surface S2 of the main pole 15 includes a portion S2*a* near the medium facing surface 80, and a portion S2*b* farther from the medium facing surface 80 than the portion S2*a*. The portion S2*a* has a shape along the first side wall SW21 to which the second side surface S2 faces. The first gap layer 18 is interposed between the portion S2*a* and the first side wall SW21 to which the second side surface S2 faces. The distance between the portion S2*a* and the first side wall SW21 to which the second side surface S2 faces is constant or substantially constant irrespective of the distance from the medium facing surface 80. The first gap layer 18 and the nonmagnetic layer 55 are interposed between the portion S2*b* and the third side wall SW23 to which the second side surface S2 faces. The distance between the portion S2*b* and the third side wall SW23 to which the second side surface S2 faces increases with increasing distance from the medium facing surface 80.

Now, functions and effects specific to the magnetic head 100 according to the present embodiment will be described. In the present embodiment, the third side wall SW13 of the second side shield 16D1 is continuous with the first side wall SW11 of the first side shield 16C1, and the third side wall SW23 of the second side shield 16D2 is continuous with the first side wall SW21 of the first side shield 16C2. In the present embodiment, in particular, the portion SW11*b* of the first side wall SW11 and the third side wall SW13 constitute one continuous side wall, and the portion SW21*b* of the first side wall SW21 and the third side wall SW23 constitute one continuous side wall. Thus, according to the present embodiment, it is possible to increase the cross-sectional area of the main pole 15 near the medium facing surface 80.

Figure 6:
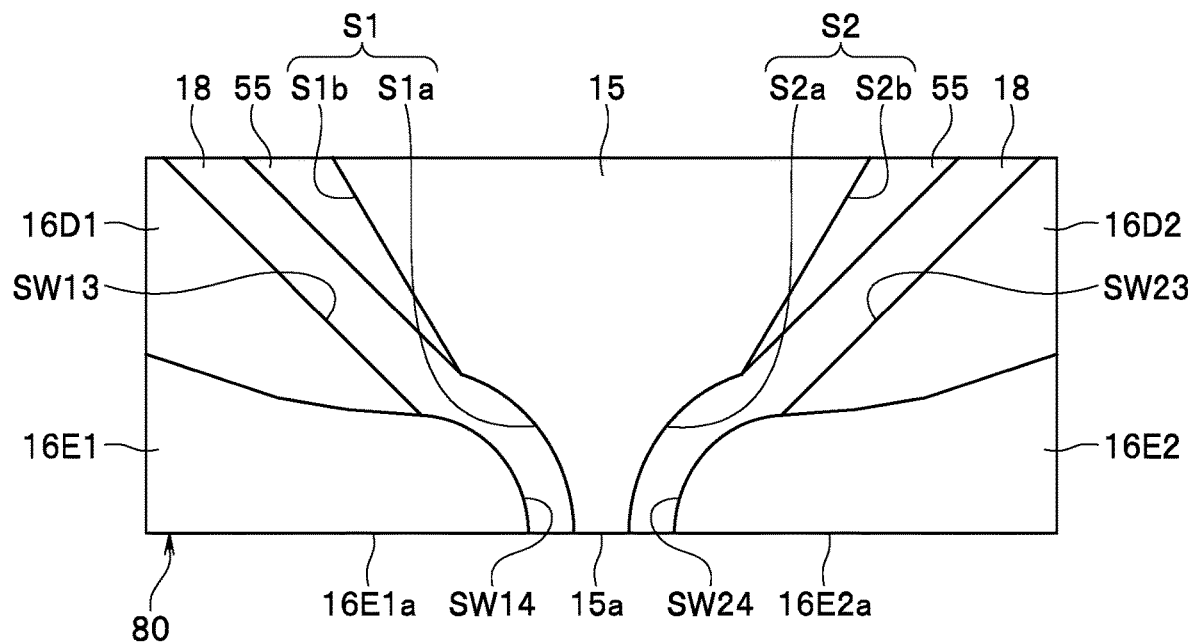
FIG. 6 is a plan view showing essential parts of the magnetic head of the comparative example.

Effects of the magnetic head 100 according to the present embodiment will be described below with comparison to a magnetic head of a comparative example. FIG. 6 is a plan view showing the essential parts of the magnetic head of the comparative example. The magnetic head of the comparative example includes a pair of first side shields 16E1 and 16E2 in place of the pair of the first side shields 16C1 and 16C2 in the present embodiment.

The first side shield 16E1 includes an end face 16E1*a* located on the medium facing surface 80, and a side wall SW14 connected to the end face 16E1*a* and partially directed toward the main pole 15. No step nor edge is formed at the side wall SW14.

The first side shield 16E2 includes an end face 16E2*a* located on the medium facing surface 80, and a side wall SW24 connected to the end face 16E2*a* and partially directed toward the main pole 15. No step nor edge is formed at the side wall SW24.

In the magnetic head of the comparative example, the second side shield 16D1 is in contact with the side wall SW14 of the first side shield 16E1. The third side wall SW13 of the second side shield 16D1 is connected halfway through the side wall SW14 of first side shield 16E1 and not continuous with the side wall SW14 of the first side shield 16E1. In other words, a part of the side wall SW14 and the third side wall SW13 do not constitute one continuous side wall.

In the magnetic head of the comparative example, the second side shield 16D2 is in contact with the side wall SW24 of the first side shield 16E2. The third side wall SW23 of the second side shield 16D2 is connected halfway through the side wall SW24 of first side shield 16E2 and not continuous with the side wall SW24 of the first side shield 16E2. In other words, a part of the side wall SW24 and the third side wall SW23 do not constitute one continuous side wall.

In the magnetic head of the comparative example, the portion S1*a* of the first side surface S1 of the main pole 15 has a shape along the side wall SW14 to which the first side surface S1 faces. The first gap layer 18 is interposed between the portion S1*a* and the side wall SW14 to which the first side surface S1 faces. The distance between the portion S1*a* and the side wall SW14 to which the first side surface S1 faces is constant or substantially constant irrespective of the distance from the medium facing surface 80.

In the magnetic head of the comparative example, the portion S2*a* of the second side surface S2 of the main pole 15 has a shape along the side wall SW24 to which the second side surface S2 faces. The first gap layer 18 is interposed between the portion S2*a* and the side wall SW24 to which the second side surface S2 faces. The distance between the portion S2*a* and the side wall SW24 to which the second side surface S2 faces is constant or substantially constant irrespective of the distance from the medium facing surface 80.

As shown in FIG. 6, the first side shield 16E1 has a shape protruding in an arc shape toward the main pole 15 from an end part of the third side wall SW13 of the second side shield 16D1, the end part being closest to the medium facing surface 80. The first side shield 16E1 also has a shape protruding in an arc shape toward the main pole 15 from an end part of the third side wall SW23 of the second side shield 16D2, the end part being closest to the medium facing surface 80. Thus, in the magnetic head of the comparative example, the cross-sectional area of the main pole 15 decreases near the medium facing surface 80.

In contrast, in the present embodiment, the portion SW11*b* of the first side wall SW11 of the first side shield 16C1 is continuous with the third side wall SW13 of the second side shield 16D1, and the portion SW21*b* of the first side wall SW21 of the first side shield 16C2 is continuous with the third side wall SW23 of the second side shield 16D2. Accordingly, as understood from FIGS. 5 and 6, the volume of the first side shields 16C1 and 16C2 decreases near the main pole 15 in the present embodiment as compared to the magnetic head of the comparative example. As a result, according to the present embodiment, the cross-sectional area of the main pole 15 increases near the medium facing surface 80 as compared to the magnetic head of the comparative example.

A manufacturing method for the magnetic head 100 according to the embodiment will be outlined below. The manufacturing method for the magnetic head 100 according to the embodiment fabricates a substructure by forming components of a plurality of magnetic heads 100, except the substrates 1, on a single wafer that includes portions to become the substrates 1 of the plurality of magnetic heads 100. The substructure includes pre-slider portions arranged in rows, the pre-slider portions becoming individual sliders later. Next, the substructure is cut into a slider assemblage that includes a row of pre-slider portions. The slider assemblage is then subjected to polishing on a surface thereof resulting from cutting the substructure, whereby the medium facing surface 80 is formed for each pre-slider portion included in the slider assemblage. Then, the slider assemblage is cut to separate the plurality of pre-slider portions from each other. This produces a plurality of sliders including respective magnetic heads 100.

A manufacturing method for the magnetic head 100 according to the present embodiment will be described below with focus on one magnetic head 100. The manufacturing method for the magnetic head 100 according to the present embodiment starts with forming the insulating layer 2, the first read shield layer 3, and the MR element 5 in this order on the substrate 1, as shown in FIGS. 1 and 2. Next, the insulating layer 6 is formed around the MR element 5. The second read shield layer 7, the nonmagnetic layer 71, the middle shield layer 72, and the nonmagnetic layer 73 are then formed in this order over the MR element 5 and the insulating layer 6.

Next, the coupling section 31 is formed on the nonmagnetic layer 73 by frame plating, for example. Then, the insulating layer 51 is formed over the entire top surface of the stack. The insulating layer 51 is then polished by, for example, chemical mechanical polishing (hereinafter referred to as CMP), until the coupling section 31 is exposed. Next, the coupling sections 32 and 33 are formed on the coupling section 31 by frame plating, for example. Next, the coupling section 32 is taper-etched in part by, for example, ion beam etching (hereinafter referred to as IBE). The insulating film 52 is then formed over the entire top surface of the stack. Next, the lower coil portion 10 is formed by frame plating, for example. The unshown insulating layer is then formed over the entire top surface of the stack. The insulating film 52 and the unshown insulating layer are then polished by, for example, CMP, until the lower coil portion 10 and the coupling sections 32 and 33 are exposed.

Next, the insulating layer 53 is formed over the entire top surface of the stack. Next, the insulating layer 53 is selectively etched to form, at the insulating layer 53, a first opening for exposing the top surface of the coupling section 32, a second opening for exposing the top surface of the coupling section 33, and a third opening for exposing the coil connection 10E (refer to FIG. 3) of the lower coil portion 10. Next, the leading shield 16B is formed on the coupling section 32 at the position of the first opening, the coupling section 34 is formed on the coupling section 33 at the position of the second opening, and an unshown first connection layer is formed on the coil connection 10E at the position of the third opening, by performing frame plating, for example.

Next, the nonmagnetic layer 54 is formed over the entire top surface of the stack. The nonmagnetic layer 54 is then polished by, for example, CMP, until the leading shield 16B, the coupling section 34, and the first connection layer are exposed. Then, the leading shield 16B and the nonmagnetic layer 55 are taper-etched in part by, for example, IBE. In this etching, the coupling section 34 and the first connection layer are also etched in part.

Figure 7:
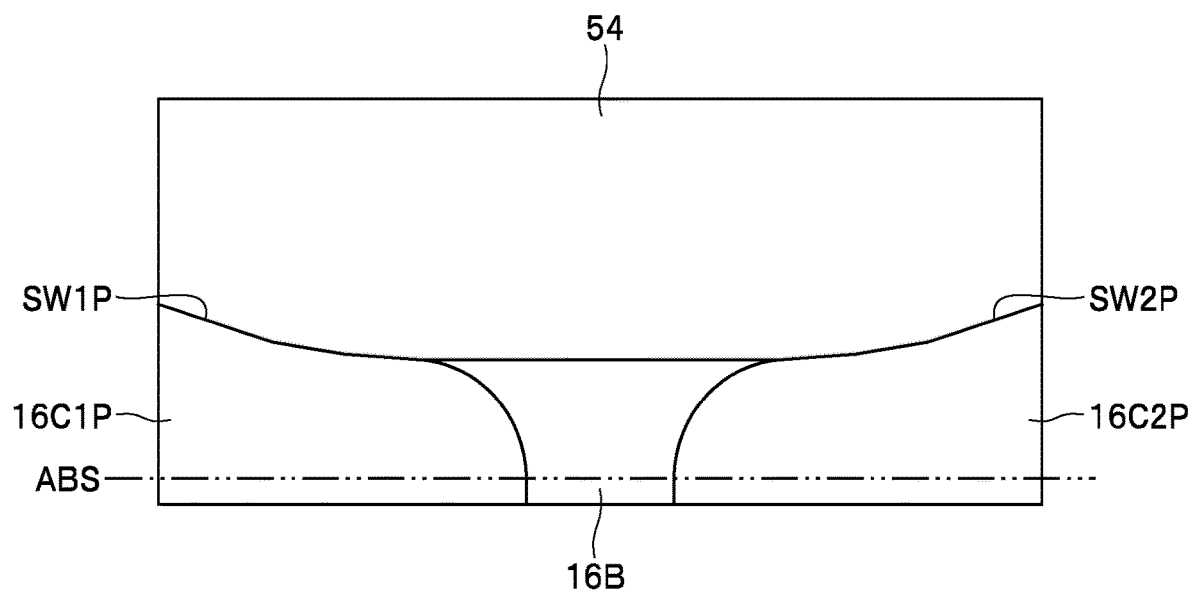
FIG. 7 is a perspective view showing a step of a manufacturing method for the magnetic head according to the embodiment of the invention.
Figure 7:
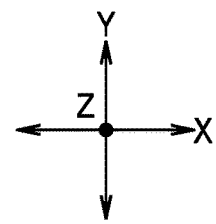
Figure 8:
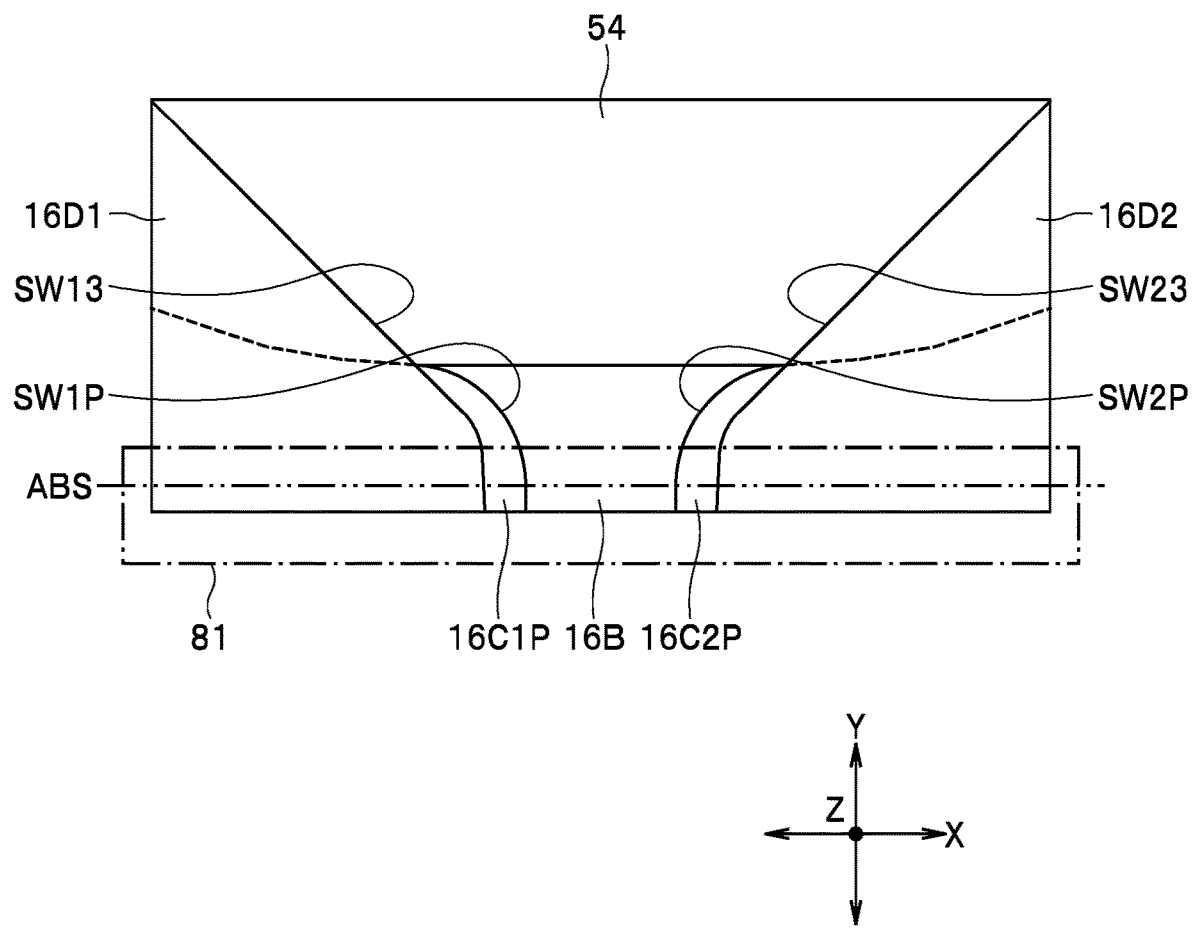
FIG. 8 is a perspective view showing a step that follows the step shown in FIG. 7.
Figure 9:
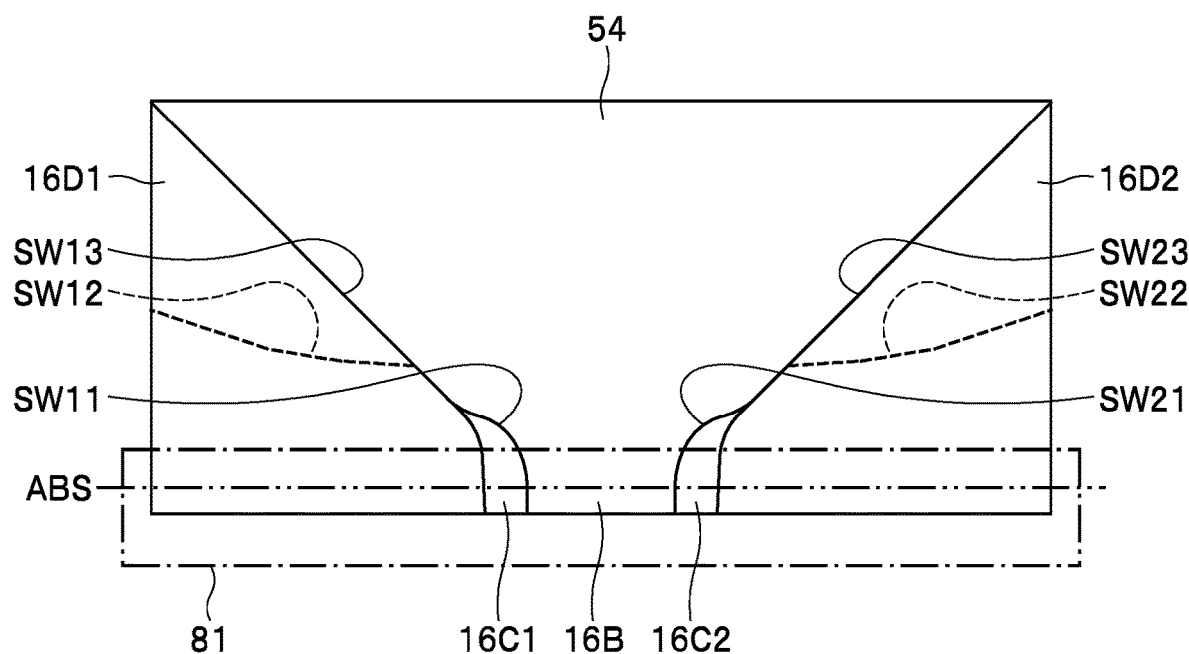
FIG. 9 is a perspective view showing a step that follows the step shown in FIG. 8.

Reference is now made to FIGS. 7 to 9 to describe a series of steps to be performed after the foregoing step up to the formation of the first side shields 16C1 and 16C2. FIGS. 7 to 9 each show a stack of layers formed in the process of manufacturing the magnetic head 100. FIGS. 7 to 9 each show the top surface of the stack. In FIGS. 7 to 9, the symbol ABS represents the position where the medium facing surface 80 is to be formed.

FIG. 7 shows a step after the leading shield 16B and the nonmagnetic layer 55 are taper-etched in part. In this step, first initial side shields 16C1P and 16C2P, which later become the first side shields 16C1 and 16C2, respectively, are formed on the leading shield 16B by, for example, frame plating. The first initial side shield 16C1P includes an initial side wall SW1P, which later becomes first and second side walls SW11 and SW12 of the first side shield 16C1. The first initial side shield 16C2P includes an initial side wall SW2P, which later becomes first and second side walls SW21 and SW22 of the first side shield 16C2.

FIG. 8 shows the next step. In this step, first, the second side shield 16D1 is formed on the first initial side shield 16C1P and the second side shield 16D2 is formed on the first initial side shield 16C2P by performing frame plating, for example. The second side shield 16D1 covers a portion of the initial side wall SW1P of the first initial side shield 16C1P, the portion later becoming the second side wall SW12, hut does not cover a portion of the initial side wall SW1P of the first initial side shield 16C1P, the portion later becoming the first side wall SW11. The second side shield 16D2 covers a portion of the initial side wall SW2P of the first initial side shield 16C2P, the portion later becoming the second side wall SW22, but does not cover a portion of the initial side wall SW2P of the first initial side shield 16C2P, the portion later becoming the first side wall SW21.

Next in the step shown in FIG. 8, a photoresist mask 81 is formed on the stack. The photoresist mask 81 covers a portion of the top surface of the stack, the portion being near the position ABS where the medium facing surface 80 is to be formed. The photoresist mask 81 also covers a portion of the initial side wall SW1P of the first initial side shield 16C1P, the portion later becoming a part of the first side wall SW11, and a portion of the initial side wall SW2P of the first initial side shield 16C2P, the portion later becoming a part of the first side wall SW21.

FIG. 9 shows the next step. In this step, the first initial side shields 16C1P and 16C2P are etched by using the second side shields 16D1 and 16D2 and the photoresist mask 81 as an etching mask. Through this etching, the initial side wall SW1P of the first initial side shield 16C1P is etched to form the first side wall SW11. The portion of the initial side wall SW1P covered by the second side shield 16D1 becomes the second side wall SW12. The first initial side shield 16C1P becomes the first side shield 16C1 when the first side wall SW11 is formed at the first initial side shield 16C1P. Through this etching, the initial side wall SW2P of the first initial side shield 16C2P is etched to form the first side wall SW21. The portion of the initial side wall SW12 covered by the second side shield 16D2 becomes the second side wall SW22. The first initial side shield 16C2P becomes the first side shield 16C2 when the first side wall SW21 is formed at the first initial side shield 16C2P.

The etching of the first initial side shields 16C1P and 16C2P is performed by using, for example, IBE. When IBE is used, the incident angle of the ion beam may be, for example, within the range of 45° to 75°, and the sweep angle of the ion beam may be, for example, within the range of 125° to 165° and within the range of 195° to 235°.

Steps following the formation of the first side shields 16C1 and 16C2 will be described below with reference to FIGS. 1 and 2. First, the photoresist mask 81 is removed. Next, the first gap layer 18 is formed to cover the leading shield 16B, the first side shields 16C1 and 16C2, and the second side shields 16D1 and 16D2. When alumina is used as the material of the first gap layer 18, the first gap layer 18 is formed by atomic layer deposition. The first gap layer 18 is then selectively etched to form therein an opening for exposing the top surface of the coupling section 34, and an opening for exposing the top surface of the first connection layer. Next, an initial main pole, which is to become the main pole 15 later, and the second connection layer (not shown) are formed by frame plating, for example.

Next, the nonmagnetic layer 55 is formed over the entire top surface of the stack. The initial main pole, the second connection layer, the second side shields 16D1 and 16D2, the first gap layer 18, and the nonmagnetic layer 55 are then polished by, for example, CMP until the first side shields 16C1 and 16C2 are exposed. Next, the nonmagnetic layer 58 is formed on the initial main pole. The initial main pole and the nonmagnetic layer 58 are then taper-etched by, for example, IBE. This makes the initial main pole into the main pole 15. The first side shields 16C1 and 16C2, the first gap layer 18, and the nonmagnetic layer 55 are also etched in part by this etching.

Next, the second gap layer 19 is formed on the main pole 15, the first side shields 16C1 and 16C2, the second side shields 16D1 and 16D2, and the nonmagnetic layer 58. Next, the nonmagnetic layer 60 is formed on the second gap layer 19. The nonmagnetic layer 60 may be formed by liftoff technique or may be formed by forming a nonmagnetic layer on the nonmagnetic layer 60 and then partially etching the nonmagnetic layer. Next, the second gap layer 19 is selectively etched to partially expose the top surface of each of the first side shields 16C1 and 16C2. Next, the trailing shield 16A is formed on the first side shields 16C1 and 16C2, the second gap layer 19, and the nonmagnetic layer 60 by, for example, frame plating.

Next, the second gap layer 19 and the nonmagnetic layers 58 and 60 are selectively etched by, for example, IBE to expose the second portion of the top surface 15T of the main pole 15. Next, the coupling section 41 is formed on the main pole 15 by, for example, frame plating. Next, the first insulating film 61 is formed on the entire top surface of the stack. Next, the first insulating film 61 is selectively etched to form, at the first insulating film 61, an opening for exposing the top surface of the second connection layer. Next, the upper coil portion 20 is formed by, for example, frame plating. Next, the unshown nonmagnetic layer is formed on the entire top surface of the stack. Next, the first insulating film 61 and the unshown nonmagnetic layer are polished by, for example, CMP until the upper coil portion 20 and the coupling section 41 are exposed.

Next, the upper coil portion 20 is taper-etched by, for example, IBE. Next, the second insulating film 62 is formed on the entire top surface of the stack. Next, the second insulating film 62 is selectively etched to form, at the second insulating film 62, an opening for exposing the top surface of the trailing shield 16A and an opening for exposing the top surface of the coupling section 41. Next, the coupling section 42 is formed on the trailing shield 16A, the coupling section 41, and the second insulating film 62 by, for example, frame plating. Next, the protective layer 70 is formed to cover the entire top surface of the stack. Then, wiring, terminals, and other components are formed on the protective layer 70, and the substrate 1 is cut near the position ABS at which the medium facing surface 80 is to be formed. The cut surface is then polished to form the medium facing surface 80, and processing such as fabrication of flying rails is performed to complete the magnetic head 100.

As has been described, the manufacturing method for the magnetic head 100 according to the present embodiment includes: the step of forming the pair of first initial side shields 16C1P and 16C2P; the step of forming the pair of the second side shields 16D1 and 16D2; the step of etching the pair of first initial side shields 16C1P and 16C2P by using the pair of the second side shields 16D1 and 16D2 as an etching mask so that the pair of first initial side shields 16C1P and 16C2P become the pair of the first side shields 16C1 and 16C2; and the step of forming the main pole 15. The step of forming the main pole 15 is performed after the step of etching the pair of first initial side shields 16C1P and 16C2P.

The present invention is not limited to the foregoing embodiment, and various modifications may be made thereto. For example, the shape of each of the first side shields 16C1 and 16C2 and the second side shields 16D1 and 16D2 is not limited to any example described in the embodiment but may be optional as long as requirements of the appended claims are satisfied.

Obviously, many modifications and variations of the present invention are possible in the light of the above teachings. Thus, it is to be understood that, within the scope of the appended claims and equivalents thereof, the invention may be practiced in other than the foregoing most preferable embodiments.

What is claimed is:

1. A manufacturing method for a magnetic head for perpendicular magnetic recording, the magnetic head comprising:
   a medium facing surface configured to face a recording medium;
   a coil configured to generate a magnetic field corresponding to data to be written on the recording medium;
   a main pole configured to pass a magnetic flux corresponding to the magnetic field generated by the coil and generate a write magnetic field for writing the data on the recording medium by means of a perpendicular magnetic recording system; and
   a write shield formed of a magnetic material, wherein:
   the write shield includes a pair of first side shields disposed on opposite sides of the main pole in a track width direction, and a pair of second side shields disposed on opposite sides of the main pole in the track width direction at a position farther from the medium facing surface than the pair of first side shields,
   the pair of first side shields each include an end face located on the medium facing surface, a first side wall connected to the end face and directed toward the main pole, and a second side wall connected to the first side wall,
   the pair of second side shields are in contact with the pair of first side shields, respectively,
   the pair of second side shields each include a third side wall,
   the third side wall of one of the pair of second side shields is continuous with the first side wall of one of the pair of first side shields, and
   the third side wall of the other of the pair of second side shields is continuous with the first side wall of the other of the pair of first side shields,
   the manufacturing method comprising:
      a step of forming a pair of first initial side shields;
      a step of forming the pair of second side shields;
      a step of etching the pair of first initial side shields by using the pair of second side shields as an etching mask so that the pair of first initial side shields become the pair of first side shields; and
      a step of forming the main pole.

2. The manufacturing method for the magnetic head for perpendicular magnetic recording according to claim 1, wherein a distance between the third side wall of one of the pair of second side shields and the third side wall of the other of the pair of second side shields increases with increasing distance from the medium facing surface.

3. The manufacturing method for the magnetic head for perpendicular magnetic recording according to claim 2, wherein a distance between a portion of the first side wall of one of the pair of first side shields and a portion of the first side wall of the other of the pair of first side shields increases with increasing distance from the medium facing surface.

4. The manufacturing method for the magnetic head for perpendicular magnetic recording according to claim 3, wherein
the portion of the first side wall of one of the pair of first side shields is a portion continuous with the third side wall of one of the pair of second side shields, and
the portion of the first side wall of the other of the pair of first side shields is a portion continuous with the third side wall of the other of the pair of second side shields.

5. The manufacturing method for the magnetic head for perpendicular magnetic recording according to claim 1, wherein saturation magnetic flux density of a magnetic material of which the pair of second side shields are formed is different from saturation magnetic flux density of a magnetic material of which the pair of first side shields are formed.

6. The manufacturing method for the magnetic head for perpendicular magnetic recording according to claim 1, wherein
the main pole has a first side surface and a second side surface that are positioned on opposite sides of the main pole in the track width direction,
a portion of the first side surface has a shape along the first side wall of one of the pair of first side shields to which the first side surface faces, and
a portion of the second side surface has a shape along the first side wall of the other of the pair of first side shields to which the second side surface faces.

7. The manufacturing method for the magnetic head for perpendicular magnetic recording according to claim 6, wherein
a distance between the other portion of the first side surface and the third side wall of one of the pair of second side shields to which the first side surface faces increases with increasing distance from the medium facing surface, and
a distance between the other portion of the second side surface and the third side wall of the other of the pair of second side shields to which the second side surface faces increases with increasing distance from the medium facing surface.

8. The manufacturing method for the magnetic head for perpendicular magnetic recording according to claim 1, wherein the step of forming the main pole is performed after the step of etching the pair of first initial side shields.

* * * * *